United States Patent
Sanders

(10) Patent No.: US 6,711,555 B1
(45) Date of Patent: Mar. 23, 2004

(54) METHOD AND APPARATUS FOR DELIVERING MAIL ITEMS TO NON-POSTAL ROUTE LOCATIONS

(75) Inventor: Michael R. Sanders, Washington, DC (US)

(73) Assignee: Intra-Mail Network, Inc., Washington, DC (US)

( * ) Notice: Subject to any disclaimer, the term of this patent is extended or adjusted under 35 U.S.C. 154(b) by 164 days.

(21) Appl. No.: 09/642,760

(22) Filed: Aug. 22, 2000

Related U.S. Application Data

(60) Provisional application No. 60/177,190, filed on Jan. 21, 2000.

(51) Int. Cl.[7] .......................... G06F 19/00; G06F 15/20
(52) U.S. Cl. ................... 705/406; 705/402; 705/407; 705/408; 705/410; 235/375
(58) Field of Search .................. 705/402, 406, 705/407, 408, 410; 53/131.2; 235/375

(56) References Cited

U.S. PATENT DOCUMENTS

| | | | | |
|---|---|---|---|---|
| 4,506,330 A | * | 3/1985 | Dlugos | 705/402 |
| 4,790,119 A | * | 12/1988 | McDaniels | 53/131.2 |
| 5,068,797 A | | 11/1991 | Sansone et al. | 705/406 |
| 5,072,401 A | | 12/1991 | Sansone et al. | 705/406 |
| 5,216,620 A | * | 6/1993 | Sansone | 705/406 |
| 5,329,102 A | * | 7/1994 | Sansone | 235/375 |
| 5,388,049 A | | 2/1995 | Sansone et al. | 705/406 |
| 5,673,193 A | * | 9/1997 | Brust et al. | 705/406 |
| 6,049,778 A | | 4/2000 | Walker et al. | 705/14 |

FOREIGN PATENT DOCUMENTS

JP  09-192609 A  * 7/1997

OTHER PUBLICATIONS

Unknown Author, "Data processing system for merger of sorting information and redunancy information to provide contextual predictive keying for postal addresses", 2 pages. Dialog.*

* cited by examiner

*Primary Examiner*—John G. Weiss
*Assistant Examiner*—Richard Woo
(74) *Attorney, Agent, or Firm*—Cahn & Samuels, LLP

(57) ABSTRACT

An apparatus and method for processing non-postal route mail records and delivering mail items to non-postal route locations. Mail records are presented for processing. Mailers then extract non-postal route records from the input mail records and address mail items using address information derived from the non-postal route records. Items destined for a particular non-postal route location are weighed and postage is paid for those items according to their weight. The items are then transported by carrier to the target non-postal route location.

4 Claims, 8 Drawing Sheets

| Label | Site Name | Contact Name | Shipping Address | City, State | Zipcode | Unique | Central |
|---|---|---|---|---|---|---|---|
| A | | | | | | | |
| B | | | | | | | |
| C | | | | | | | |
| D | | | | | | | |

University Name: Villanova University
Alias (i.e., UVA):
Alias 2 (if applicable):
Mgr., Mail Center: Michael R. Powers
Mail Center Address:
City, State:
Zipcode:
Zipcode 2 (if applicable): Unique: ☐
Zipcode 3 (if applicable): Unique: ☐
Unique: ☐

Number of Students living on Campus:
Number of Faculty/Staff on Campus:

Central: ☐

Special Handling:

FIG 2a

| Order Seq | Dorm/Bldg Name | Dorm Alias | Contact Name | Address1 (Main) | Apt#, Box (Range) | Address2 (if applicable – include ranges) | City, State | Zipcode | Label |
|---|---|---|---|---|---|---|---|---|---|
| 1 | Rhoades Hall | RH | Powers | 123 E Main St NW | 1 – 18777 | | Richmond VA | 23232 | A |

FIG. 2b

METHOD AND APPARATUS FOR DELIVERING MAIL ITEMS TO NON-POSTAL ROUTE LOCATIONS

This application claims priority from provisional application No. 60/177,190 filed on Jan. 21, 2000.

FIELD OF THE INVENTION

This invention relates to mail item carriage and delivery. More specifically, this invention relates to a system and method for processing of mail records to improve mail item delivery.

BACKGROUND OF THE INVENTION

1. Glossary

The terms appearing below are used throughout this document and are defined as follows.

Delivery Point—a room or range of rooms within the destination.

Destination—a site within the non-postal route location where mail items may be delivered.

Non-Postal Route—routes on which mail is not carried by the United States Postal Service.

Non-Postal Route Location—an entity comprised of at least one building located on a non-postal route and having one or more delivery points.

Postal Route—routes on which mail is carried by the United States Postal Service. They include post roads as defined in title 39, U.S. Code, 5003 as follows: a) the waters of the United States, during the time the mail is carried thereon; b) railroads or parts of railroads and air routes in operation; c) canals, during the time the mail is carried thereon; d) public roads, highways, and toll roads, during the time the mail is carried thereon; and e) letter-carrier routes established for the collection and delivery of mail.

2. Description of the Art

Each year, large volume mailers send millions of mail items to non-postal route locations such as universities, military installations, hospitals, large apartment complexes and, government agencies. For example, credit card companies frequently send credit card applications to colleges and universities to be distributed to students in dormitories. Given the number of colleges and universities in the United States, the postage costs for such mailings may approach seven figures as the United States Postal Service (USPS) charges a per piece rate for each mail item placed in the USPS mail stream.

In order to take advantage of USPS discounts, typical large volume mailers sort and bundle their outgoing mail items according to zip code and deliver the bundled mail items to the USPS. Once the USPS approves the presorted mail, a per piece charge is billed to the mailer's postage account. As of the filing date of this application, the discount per piece rate is approximately $0.16 for $3^{rd}$ class mail and $0.28 for $1^{st}$ class mail. The rates are higher if the mail items are not presorted and bundled. Accordingly, even with USPS discounts, postage expenses are still in the lower seven figure upper six figure range.

The USPS delivers the mail to the non-postal route locations in accordance with its standard delivery practices for the zip code area. However, the USPS does not deliver the mail items to the delivery point because the delivery point lies on a non-postal route. Rather, the USPS delivers the mail items to a site, e.g., an internal mail center, within the non-postal route location. Typically, delivery takes between 3 to 15 days. When delivered, the mail items are not in any particular order so they must be sorted and sequenced by the non-postal route location's internal mail center staff to facilitate further distribution to their intended recipients.

Distribution of the mail items from the internal mail center to the delivery point is performed according to the policies and procedures of the non-postal route location. According to USPS policies, the non-postal route location may refuse to accept a mail item when it is offered for delivery or, within a reasonable time after delivery, return the mail item. The USPS has no responsibility for the mail items once they have been delivered to the non-postal route mail location and does not guarantee that the mail items will reach their intended recipients.

Heretofore, large volume mailers have made little distinction between their mailings to non-postal route locations and their general mailings. This has caused large volume mailers to incur excessive postage expense, slow mail delivery, unpredictable delivery dates and has hampered address tracking capabilities, Moreover, from the perspective of the non-postal route locations, excessive person hours have been needlessly spent in distributing mail from their mail centers to their delivery points. The inventor is aware of no system that specifically addresses processing and delivery of mail items destined for non-postal route locations.

SUMMARY OF THE INVENTION

It is an object of the invention to simplify the process of storing, sorting and sequencing non-postal route records.

It is another object of the invention to provide a method and apparatus to extract non-postal route records from among a group of mail records.

It is still another object of the invention to provide a method and apparatus to facilitate postage savings for non-postal route mail items.

It is a further object of the invention to provide for faster delivery of non-postal route mail items.

It is yet another object of the invention to provide predictable delivery dates for non-postal route mail items.

In accordance with an aspect of the invention, a method for delivering materials to a non-postal route mail location Is provided. That method Includes separating non-postal route mail records from postal route mail records and affixing address information derived from the non-postal route mail records to materials to be delivered. The materials to be delivered may then be weighed in preparation for mailing. Postage for the materials to be delivered is paid based upon the weight of the materials and transport of the materials to the non-postal route mail location is facilitated.

In accordance with another aspect of the invention, a computer readable medium contains a data structure for storing non-postal route data records for access by an extraction program. The data structure includes a non-postal route data table containing one or more non-postal route data sets. The data structure further includes a destination data table containing one or more destination data sets corresponding to the one or more non-postal route data sets. Each non-postal route data set has a link to the corresponding destination data sets of the destination data table. The data structure also includes a delivery point data table containing one or more delivery points corresponding to each destination data set. Each destination data set has a link to the corresponding delivery points of said delivery point data table.

In accordance with yet another aspect of the invention a data processing system having a non-postal route mail data table including one or more non-postal route data sets extracts non-postal route mail records from among a plurality of input mail records. The data processing system selects address information from an input mail record, compares the selected address information to address information of each of the one or more non-postal route data sets until a match is found; and repeats the selection and comparison steps for each of the plurality of input mail records.

In accordance with a further aspect of the invention, a data processing system is provided for executing an extraction program which interfaces with a data table assemblage. The data processing system includes a processor for processing said extraction program and a medium readable by the processor for storing a data structure for access by the extraction program. The data structure includes information resident in the data table assemblage used by the extraction program. More particularly, the data structure may include a non-postal route data table containing one or more non-postal route data sets. The data structure may further include a destination data table containing one or more destination data sets corresponding to the one or more non-postal route data sets. Each non-postal route data set preferably has a link to the corresponding destination data sets of the destination data table.

The data structure may also include a delivery point data table containing one or more delivery points corresponding to each destination data set. Each destination data set preferably has a link to the corresponding delivery points of the delivery point data table.

BRIEF DESCRIPTION OF THE DRAWINGS

FIG. 2a depicts a number of non-postal route data fields in accordance with the present invention, FIG. 2b illustrates additional non-postal route data fields in accordance with the invention.

DETAILED DESCRIPTION OF THE INVENTION

The present invention is directed to an innovative process and apparatus for facilitating delivery of non-postal route items. The invention allows mailers to increase the speed of their mail sortation, monitor address integrity and realize significant cost savings. In addition, the invention provides non-postal route locations with items that may be presorted and sequenced according to the recipients desired pattern and provides the recipient with substantial cost savings.

The invention is particularly useful for large volume mailers such as credit card companies, direct mail advertisers, magazine publishers, utility companies, etc. Likewise, the invention is particularly useful for recipients such as large non-postal route locations, especially those with internal mail distribution operations such as universities, military installations, large businesses, large hospitals, and the like. By receiving non-postal route items presorted and sequenced according to their own specifications, the non-postal route locations may significantly reduce staff hours in their internal mail rooms, thus realizing a substantial cost savings. In addition, to the aforementioned cost savings, in accordance with the invention, the non-postal route locations may be given a financial reward for accepting mail from qualified mailers.

In keeping with the general aspects of the invention, mailers generate and supply input mail records for processing. These records typically include postal route records as well as non-postal route records. Mailers then separate the non-postal route records from the postal route records. If the number of non-postal route records addressed to a given non-postal route location does not exceed a threshold number, then those non-postal route records may be processed like the postal route records. Address information may be extracted from the non-postal route records and associated with the items to be mailed either by affixing a label containing the address information to the item or by printing the address information directly onto the item. Such items may include letter items and non-letter items including but not limited to newspapers, magazines, periodicals, parcels, music CD's, CD ROM's, compact disks, etc. The mail items may then be weighed to allow the sender to pay postage for the mail items according to their weight. The mail items may then be transported to their intended non-postal route location for distribution. In connection with a specific embodiment of the invention, the non-postal route location may be provided with a rebate for providing non-postal route data to the mailers. The rebate may be in the form of cash or non cash consideration.

Figure 1:
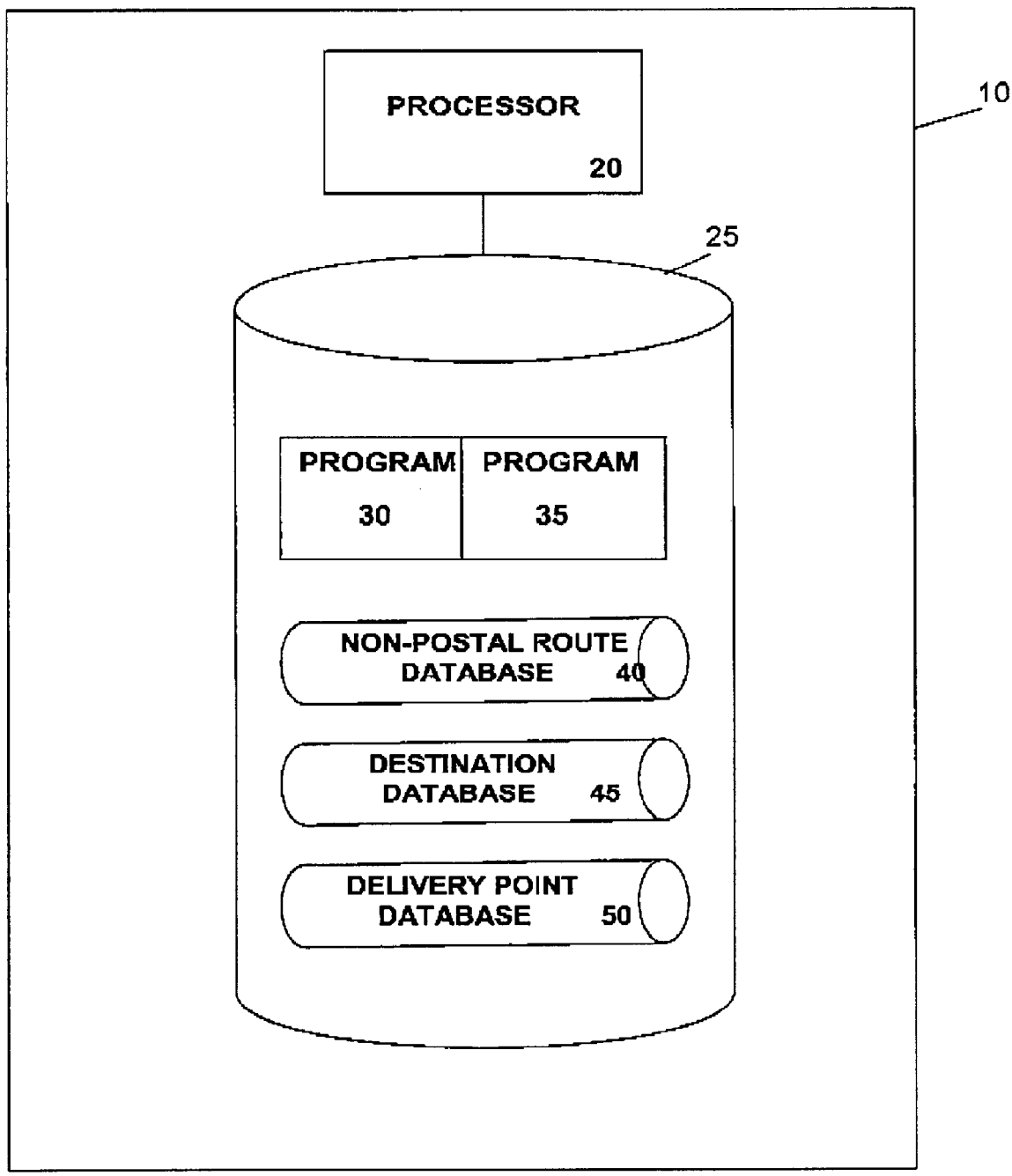
FIG. 1 is a block diagram of a system in accordance with the present invention.

Referring to FIG. 1, a central controller 10 for extracting non-postal route mail records from input mail records and sorting and sequencing non-postal route mail records includes a processor 20 connected to a data storage device 25. Input mail records may be input to central controller 10 via standard data entry devices (not shown), e.g., keyboards and optical scanning devices, or input mail records may be downloaded from a separate storage device (not shown). Processor 20 preferably includes one or more conventional microprocessors. Data storage device 25 may be CD ROM, a floppy disk, a hard disk, or other memory media or any combination of the foregoing. Data storage device 25 and processor 20 may be disposed on the same platform or on separate platforms. For example, data storage device 25 and processor 20 may each be (i) located entirely within a single computer or other intelligent device, (ii) connected to each other by a remote communication link, such as a cable, telephone line, wireless transceiver including optical, satellite, RF, etc.; or any combination of (i) and (ii). In the preferred embodiment, processor 20 and data storage device 25 are disposed on a single platform.

As illustrated, data storage device 25 preferably stores a first and second programs 30 and 35 for driving processor 20, a non-postal route data table 40, a destination data table 45 and a delivery point data table 50. Programs 30 and 35 cause drive processor 20 to operate in accordance with the present invention, and particularly in accordance with the methods described herein. Programs 30 and 35 may also include program elements that may be necessary, such as "device drivers" for interfacing with computer peripheral devices. Appropriate device drivers and other necessary program elements are known to those skilled in the art, and need not be described in detail herein. Each of the data tables 40, 45 and 50 is described in detail below and depicted with exemplary entries in the accompanying figures. As will be understood by those skilled in the art, the schematic illustrations and accompanying descriptions of the data tables presented herein are exemplary arrangements for stored representations of information. A number of other arrangements may be employed besides the tables shown. Similarly, the illustrated entries represent exemplary information, but those skilled in the art will understand that the number and content of the entries can be different from those illustrated herein.

Building Data Tables

Each non-postal route location provides data sufficient to identify each destination and delivery point as non-postal route input data. As illustrated in FIG. 2a, such address data includes at least the following data fields: 1) non-postal route location name, e.g., university name, 2) mail center address, 3) indication of whether zip code is unique. In addition, as depicted in FIG. 2b, additional data fields such as: 1) destination name, e.g., dormitory/building names, including commonly used nicknames, a valid street address, a valid city, state, and zip code, and 3) delivery points, e.g., box numbers, room numbers, mail stops, or any other designator. In addition the address information preferably includes the order in which to sequence the delivery points as well as shipping locations. As shown in FIGS. 2a and 2b, other data may be provided as desired to facilitate further processing.

Figure 3:
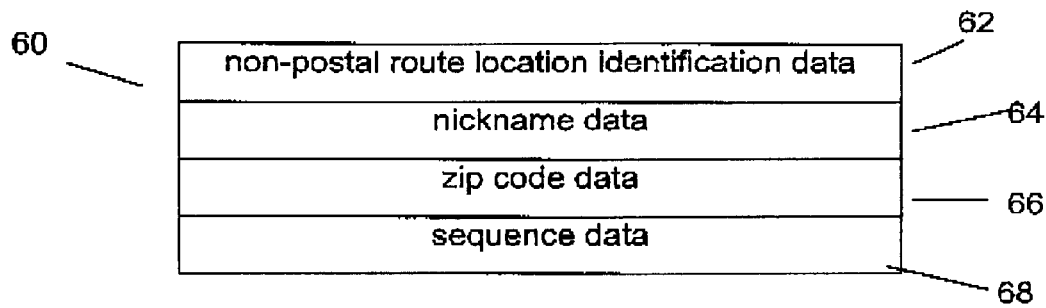
FIG. 3 shows a non-postal route data set of the present invention.

In accordance with the invention, first program 30 causes processor 20 to build non-postal route data table 40, destination data table 45 and delivery point data table 50 based upon the non-postal route location input data. More particularly, in constructing non-postal route data table 40, processor 20 preferably stores non-postal route data sets 60, as illustrated in FIG. 3, including the a non-postal route identification data 62 comprising the non-postal route location's formal name and addresses, nickname data 64 comprising any aliases or nicknames by which the non-postal route location may be known, and zip code data 66 comprising all possible zip codes encompassed by the non-postal route locations. In addition, data set 60 preferably includes sequence data 68 comprising a code to be appended to matching records identified during the extraction procedure described below.

Figure 4:
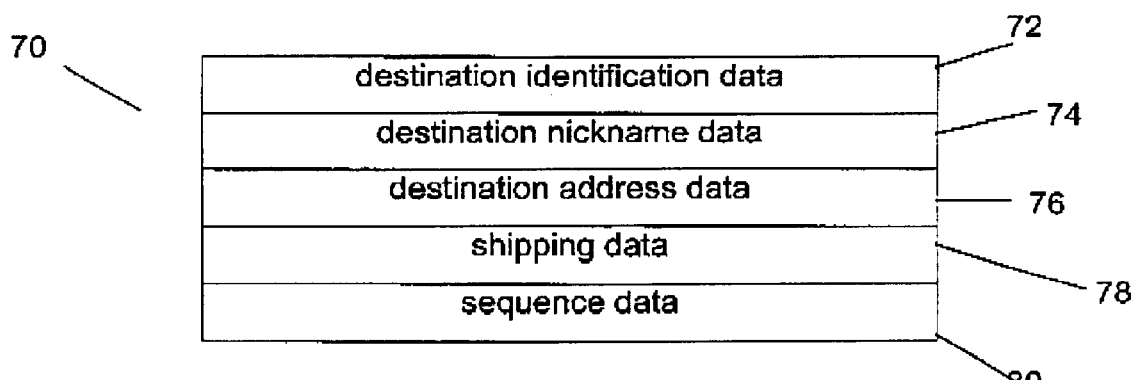
FIG. 4 depicts a destination data set of the present invention.

Turning to destination data table 45, first program 30 preferably directs processor 20 to build destination data table 45 from the non-postal location input data by preferably storing destination data sets 70, as depicted in FIG. 4, including destination identification data 72 comprising the name of the destination, destination nickname data 74 comprising any aliases or nicknames for the destination, destination address data 76 comprising a valid street address for the destination including city, state and zip code. To facilitate delivery, letter items may be bundled for each destination in the non-postal route location. Accordingly, each destination data set 70 preferably includes shipping data 78 comprising an address for shipping of the bundle as the bundle may be shipped directly to the destination itself or it may be shipped to a central location for distribution to the destination by non-postal route location personnel. Non letter items may or may not be similarly bundled. Destination data table 45 may also contain sequencing data 80 comprising a sequence designation indicating the order of delivery of materials between multiple destinations.

First program 30 further causes processor 20 to build delivery point data table 50 from the non-postal route input data. Delivery point data table 50 preferably includes one or more delivery point data sets 82, illustrated in FIG. 5A, wherein each delivery point data set 82 contains all possible individual delivery points 84 within the destination; for example, each room in a dormitory. In addition, each delivery point data set 82 preferably includes delivery point sequence data 86 comprising sequence designations for each delivery point to indicate the order of delivery of materials between multiple delivery points.

Figures 5A, 5B:
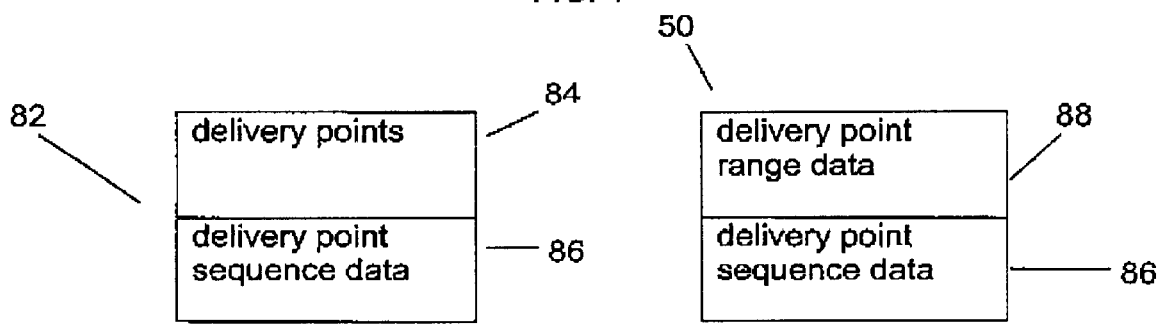
FIG. 5a illustrates a delivery point data set in accordance with a first embodiment of the present invention.
FIG. 5b shows a delivery point data set In accordance with a second embodiment of the invention.

Alternatively, as shown in FIG. 5B, delivery point data table 50 may include delivery point range data 88 comprising a range of delivery points which can be used in conjunction with a sequencing method (ascending or descending) to effect delivery in lieu of the individual delivery points. An exemplary sequence method may entail, for example, all boxes on the first floor being delivered sequentially, and delivering the second floor in reverse order. To realize the sequence method, the range of delivery points may be provided with indicators that, during the sortation process to be described herein, will signal to a sort engine that boxes 100–199 are to be sorted in ascending order, then 200–299 in descending order.

For delivery point ranges to be used effectively, it is preferred that designations stored in delivery point data table 50 that represent individual delivery points meet criteria that can be sorted via standard electronic means (i.e.: standard alpha and/or numeric designations). If the range criteria cannot be met, it may be necessary to create a single record for each potential delivery point in that segment.

Figure 6:
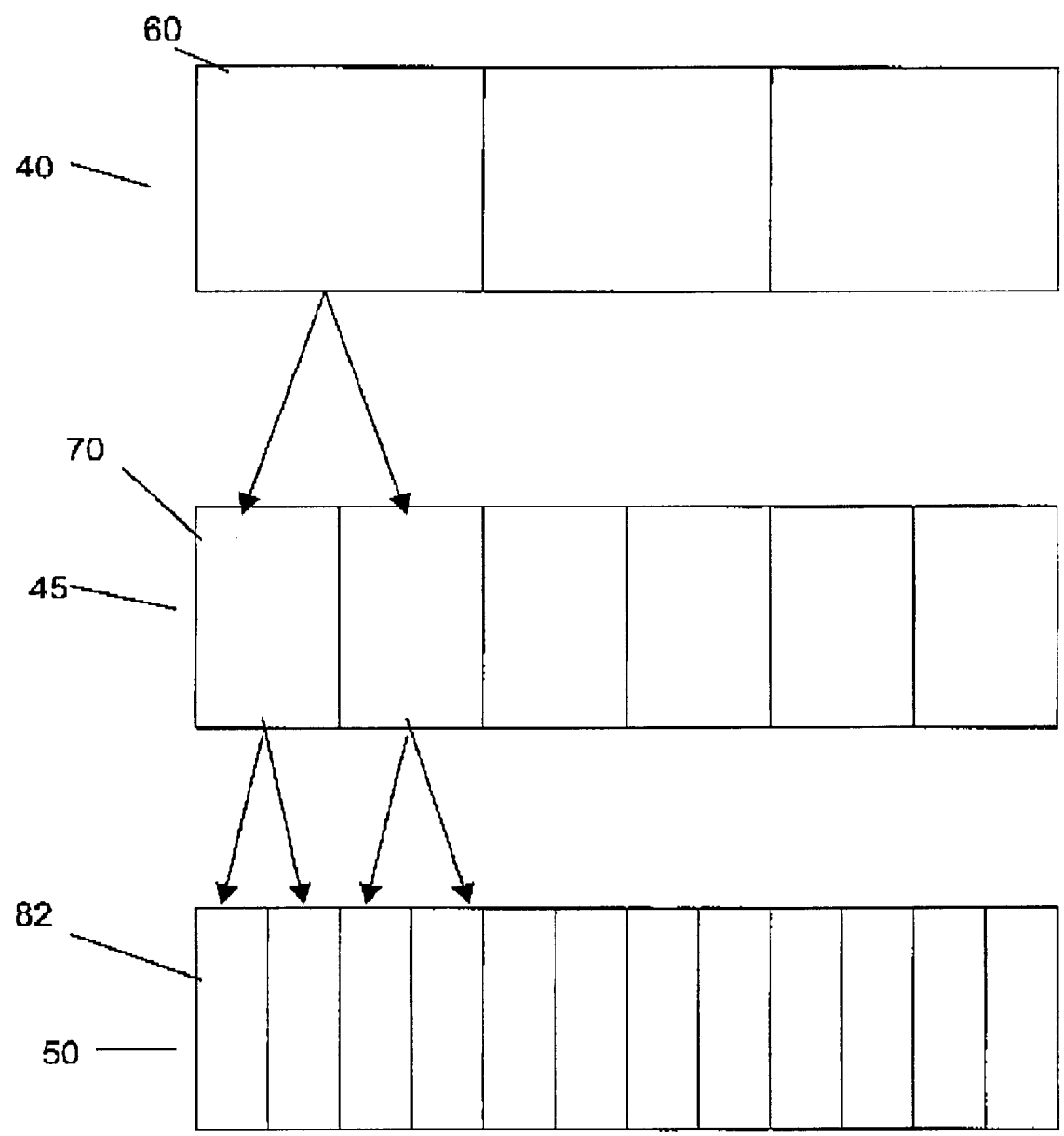
FIG. 6 illustrates a non-postal route data table, a delivery point data table and a destination data table and their respective relationships.

For each non-postal route location, the non-postal route mail record comprises the non-postal route data set 60, the corresponding destination data sets 70 and the corresponding delivery point data sets 82. In addition, non-postal route data table 40, destination data table 45 and delivery point data table 50 are each preferably relational data tables and each data table is preferably mapped to one of the other data tables according to a set pattern. As illustrated by way of example in FIG. 6, each non-postal route data set 60 in the non-postal route data table 40 has one or more corresponding destination data sets in destination data table 45. In keeping with the invention, each non-postal route data set 60 may have a link to its corresponding destination data sets 70 stored in destination data table 45. Likewise, each destination data set 70 has one or more corresponding delivery point data sets 82 in delivery point data table 50. Accordingly, each destination data set 70 may have a link to corresponding delivery point data sets 82.

Alternatively, non-postal route location data sets 60, destination data sets 70 and delivery point data sets 82 may be stored in individual relational databases where the databases are linked in a manner similar to that described above with respect to non-postal route data table 40, destination data table 45 and delivery point data table 50.

Each data set contained in non-postal route data table 40, destination data table 45 and delivery point data table 50 may be provided with a sequence number, i.e., a numeric indicator, to be used in the sortation process to be described below. The numeric indicator is preferably selected to provide ample room for insertion. For example, the numeric indicators may be multiples of 100 to permit updates, insertions, and deletions as needed through regular, periodic maintenance.

Once non-postal route data table 40, destination data table 45 and delivery point data table 50 have been built, sortation and sequencing of addresses may be performed. Large volume senders often send items to both postal route and non-postal route locations. In accordance with an aspect of the invention, non-postal route mail records may be separated from postal route mail records to facilitate sorting and sequencing of non-postal route mail records in accordance with the rules of the non-postal route location to which they are destined.

Extraction

Figure 7:
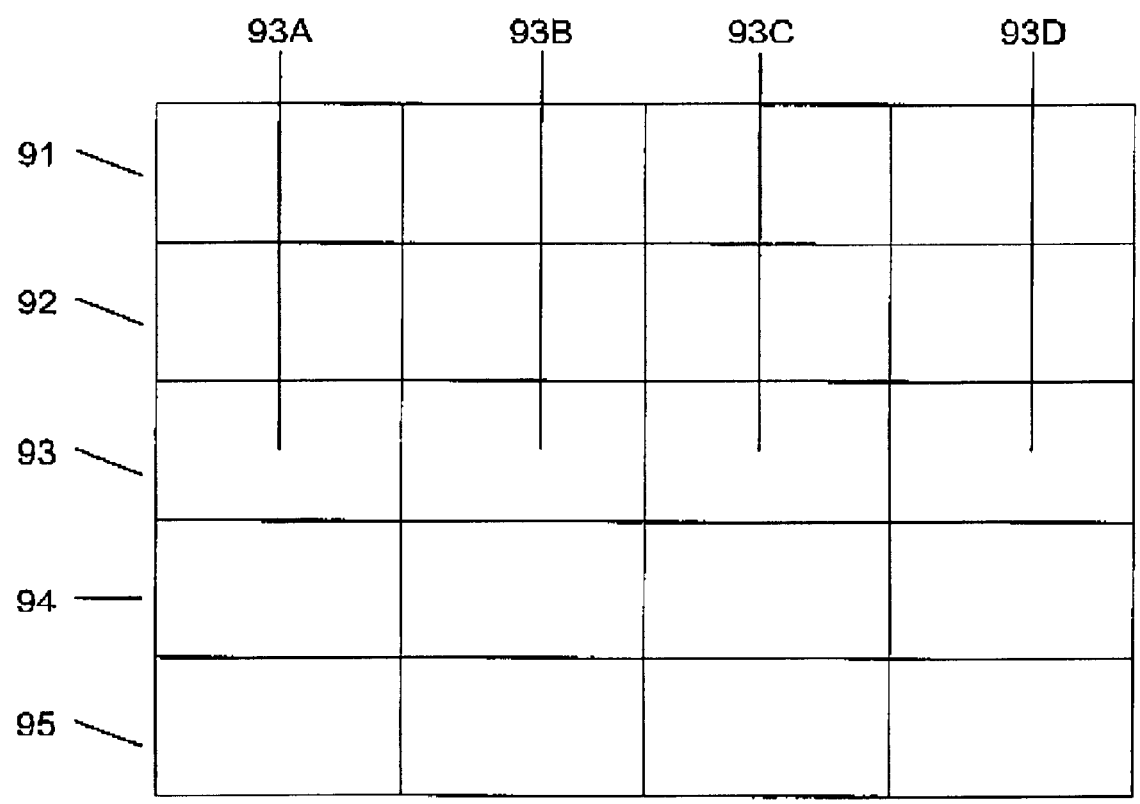
FIG. 7 depicts an input mall record.

With reference to FIG. 7, in the ordinary course of mailing operations, mailers generate an input mail record 90 for each item to be sent. The input mail record 90 may include the following data items: the type of mailing (letter or non-letter) 91, an indication as to whether the mailing data is intended for test or production processing 92, address information 93, the size of the input record 94 and the location on the output record for processing information (sort key and other descriptive data) 95. Each data item may include a plurality of segments containing selected classifications of data. For example, the address information may include a first segment 93A containing the name of the location (either postal route or non-postal route), a second segment 93B containing the street address of the destination, a third segment 93C containing the name of the destination and a fourth segment 93D containing the city, state and zip code for the destination. Other segments may also be included if desired.

Figure 8:
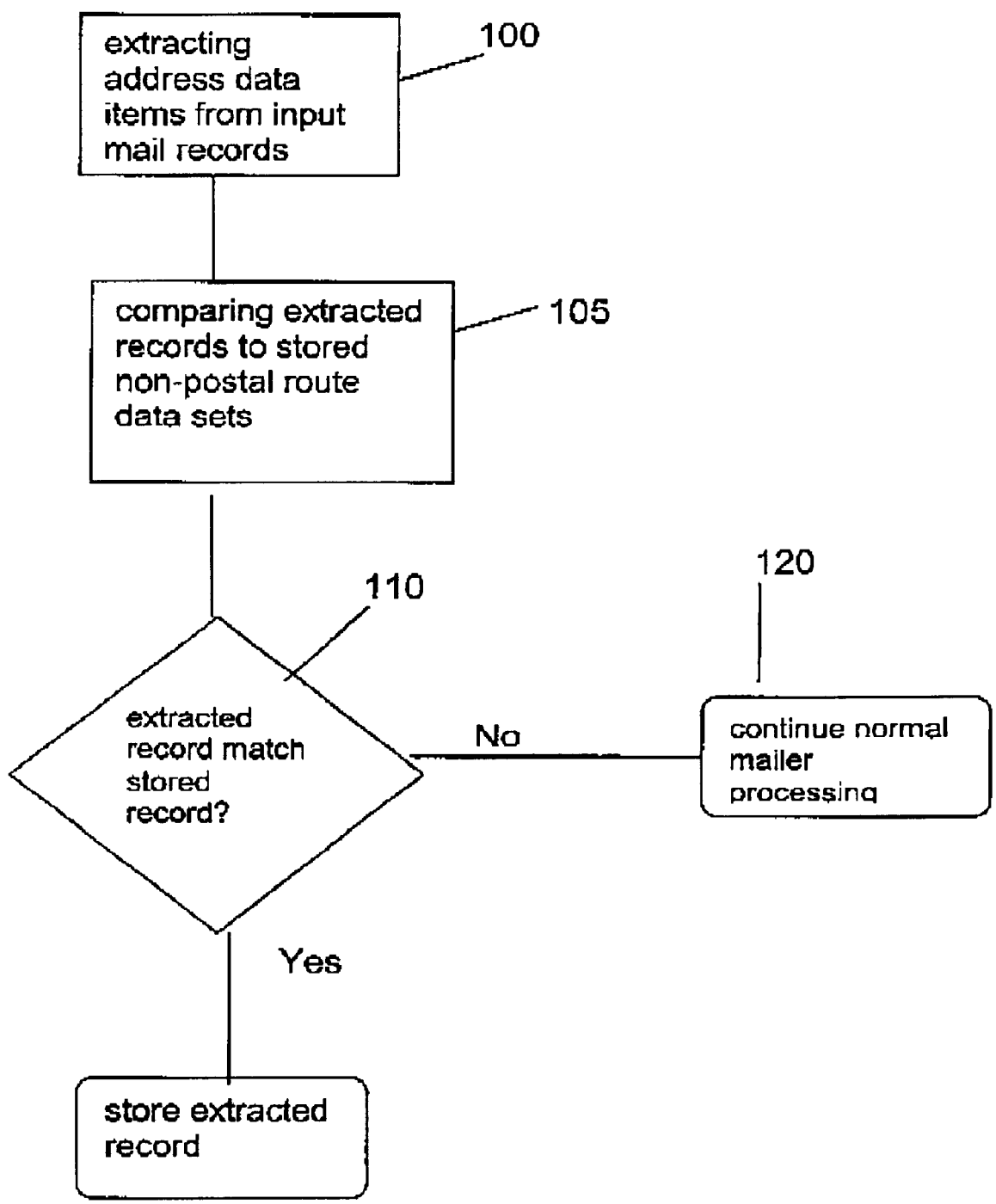
FIG. 8 shows a flow chart of the extraction process according to an embodiment of the invention.

In keeping with the invention, referring to FIG. 8, non-postal route mail records are extracted from input mail records to facilitate optional further processing, e.g., sorting and sequencing, prior to delivery. Non-postal route mail records are mail records that include non-postal route addresses. In the extraction method, each input mail record is preferably tested for its eligibility to be passed to a sort engine. In order to adequately test the input mail records, certain data is preferably parsed from the record. In accordance with a particularly preferred aspect of the invention, in the extraction method, address data items are preferably parsed from the input mail records (step 100) and compared to the non-postal route data sets, the destination data sets and the delivery point data sets to find a match through a comparison/matching process (steps 105 and 110). If a match is found, the mail record is segregated for processing by program 35. Any mail record not meeting match criteria is considered a postal route mail record and will continue normal mailer processing with no modifications (step 120).

In an exemplary comparison/matching process, the parsed address data items may be stored in a work area. The specific address data items to be stored in the work area are preferably determined by parameters pointing to segments in the Input mail record 90. Preferably, up to four segments (93A, 93B, 93C and 93D) may be specified. Alternatively, greater or fewer segments may be specified depending upon the specific application. The segments are preferably listed in traditional address label sequence. It is preferred that only segments that may contain address data items be listed. It is further preferred to avoid pointers to student name or other personal data items.

Figure 9:
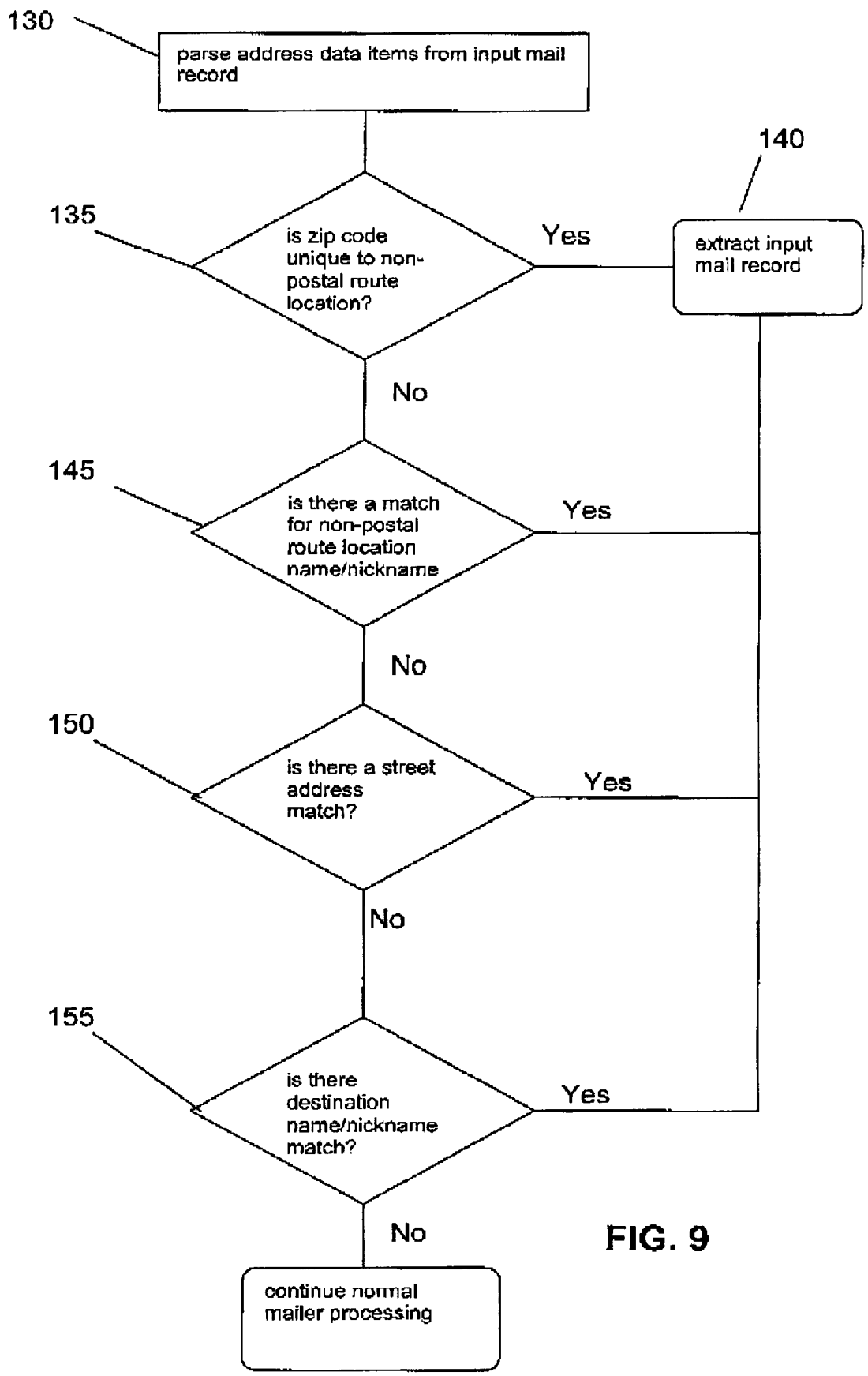
FIG. 9 depicts a flowchart of a matching process in accordance with the present invention.

As illustrated in FIG. 9, program 35 preferably causes processor 20 to parse address data items from input mail record 90 (step 130). In operation, processor 20 may begin interrogating input mail record 90 at the last specified segment, 93D. Interrogation may then proceed in reverse, towards the first segment listed. The program 35 preferably finds the last segment that contains non-blank data, and uses that as the city, state, and zip information. Based on the segment where the city/state data is stored, all data from the previously listed segments will populate work areas.

A primary test for input mail record matching is by zip code. If the zip code is identified as unique to the non-postal route location, that input mail record will be extracted (135 and 140). For all other zip codes, a secondary confirmation test is preferably made before extracting the record. The parsed address data items are preferably compared to data contained in the non-postal route data table 40, the destination data table 45 and the delivery point data table 50. If a match is found for any of the following than the record will be extracted: non-postal route location name or nickname, street address, destination name or nickname (steps 140, 145, 150 and 155). Processor 20 may search for these matches in any order desired. If no matches are found, than the input mail record is not extracted.

While foregoing constitutes a preferred comparison matching procedure, within the spirit and scope of the invention, any reliable procedure may be used to identify and extract non-postal route mail records from postal route mail records.

In keeping with an aspect of the invention, program 35 preferably maintains an internal counter to tally the number of records extracted for each non-postal route location. When all input mail records have been processed, that tally may be compared to a threshold number. The threshold number preferably represents the minimum number of records that will allow mailers to realize cost savings over normal U.S. mail processing. The inventor has determined that a preferred threshold number is about 400. It should be noted that other threshold numbers may be chosen according to business concerns of the mailers. If the number of extracted records does not equal the threshold number for a particular non-postal route location, all records for that non-postal route location will be removed from the extract file and included with all other non-matching records for normal mailer processing.

Once the non-postal route records have been extracted from the input mail records they may be modified by program 35 for input to a sort utility. That is, program 35 may assign a designation to each data set corresponding to a non-postal route location. That designation may be used by the sort utility to resequence all eligible records into the correct delivery sequence. The Sender or recipient may find the designations useful, so they may be printed on each mail item to be included in a shipment. Designations may also be assigned for those mail items that have a delivery point outside the bounds of addresses identified by the non-postal route location.

Turning more specifically to the comparison/matching routine, keywords may be used to parse data that will be primarily responsible for accurate matching. Some pseudo-intelligent logic is preferably used in conjunction with keywords to assist with matching. For example, an address data item may be interrogated for the word 'of'. If it is found, it is likely that a match can be made. The next search may be for a word beginning with letter 'U'. Once that is found, all remaining words and phrases will be used to hone in on the non-postal route location to which this record should be directed. For example, if 'MD' is found, this record will be assigned to the University of Maryland memory sector. Discovery of a word beginning with the letter 'U' that has other characteristics of a university designation, for example, will also help to assign the input mail record correctly.

Once the non-postal route location has been identified, matching may be carried out by address or by building (dormitory) name. If a street address is provided, it will preferably be checked against street addresses for each destination or delivery point in destination data table 45 and delivery point data table 50 corresponding to the identified non-postal route location. The type of address information present may be determined with the help of keywords. To attempt to locate a street address, a search will be made for standard postal street suffixes (Rd, St, Ave, Ter, Blvd, Hwy, etc.). Upon finding a valid match to one of those keywords, that segment of the address data item may be identified as a street address. If there is no street address, an attempt may be made to find a building name. Keywords that will help locate the destination name include 'Hall', 'Bldg', 'Building', 'Dorm', and 'Dormitory'.

In attempting to locate the correct destination to which the input mail record belongs, a standard matching algorithm may be used. An exemplary standard matching algorithm operates as described below.

The matching algorithm expects to receive the target data from input, and a group of potential matches. The module will parse the input data and compare it to each possible match. Individual comparison results are preferably weighted. For example, if the first four letters of a word are exactly the same, a high weight will be assigned. Then, the remaining letters may be compared to see how many match, and in what sequence. When the comparison is complete, the score will be stored in memory with that possible match.

Then the next candidate for matching will be subjected to the same process. If its final score is greater than the one stored in memory, this new one may be stored, and the lower scoring one discarded. This process repeats until the entire group has been scored, at which time the most likely matching candidate may be passed back to continue on with other processing. If no potential matches meet the minimum specifications, then no match is returned.

There will be certain minimum criteria that must be met for any match. That criteria may include the following elements: 1) the target and its match should have roughly the same number of letters; 2) the first letter of the target and its match should match; and 3) consonants carry more weight than vowels, so typically a higher consonant match will out-weigh a similar vowel match. To illustrate, for example, the name Colby may result in a high score when matched against Coleby, Coldbie, Collbe. However, it would not be a good match to Cols, Scolsby, or Colsberiety.

The values to assign for each matching segment may be selected based upon what the user finds provides the best solution for the particular matching problem. For example, when three letters are found in the same sequence, more weight may be assigned than if three letters are the same, but slightly out of order, or with an stray letter between them. However, those situations should still carry substantial weight, particularly if the different sequence is common (ie/ei).

In a preferred embodiment, the aforementioned matching algorithm may be used to compare the input destination name (excluding key words) to all destinations assigned to the non-postal route location. The one to which it matches most closely, but with some minimum criteria, is the one to which it will be assigned.

If there are no destinations to which the input mail record matches even to the minimal extent required, the input mail record is still preferably included in the mailing for that non-postal route location, but all key elements exclusive of the highest level, will be populated with high values which will cause the sort utility to separate the record from others. In addition, a descriptive code may be attached to records that cannot be matched at a destination level. That code may optionally be printed on the mail piece to trigger action for correction.

Once the building is located, an attempt is made to find the sequencing segment to which the input mail record belongs. Keywords such as 'Room' or 'Box' will be used to determine the delivery point corresponding to the input mail record. Upon detection of one of these or a similar keyword, the physical location will be used to match to the delivery point data sets. If the delivery point data sets are in ranges, comparisons will be made to find the delivery point to which it belongs. Both upper and lower ranges must be compared to assure accuracy of assignment.

When the delivery point has been located, codes may be appended to the input mail record to facilitate sorting. The codes may include an indicator for the non-postal route location, the shipping location (for the bundle in which this record will be), the destination, and the delivery point for this item corresponding to the destination.

If an input mail record falls within a destination, but no matching delivery point can be identified, that piece of the sort key will be populated with high values, causing that record to fall to the back of all accurately sorted addresses. A descriptive code may be attached to the input mail records that cannot be matched at the delivery point. This code will differ from that used if no match is found at the destination level, but it too may optionally be printed on the mail piece to trigger action for correction.

If the delivery point level match falls within a specified range, the actual box (room, etc.) may be used as part of the sort key. If the range is designated as one that is delivered in descending order, this part of the key will be complement of its actual value (use its negative value). This function will maintain the correct sequencing of the piece within the mailing.

In accordance with a preferred aspect of the invention, when all input mail records have been extracted and sort keys assigned, the extracted records may be sorted, using a standard sort utility (such as SyncSort available from Syncsort, Inc., 50 Tice Boulevard, Woodcliff Lake, N.J.; or Optisort). The sort utility preferably uses the sequencing codes appended to the input mail record to produce mail records sorted and sequenced according to the instructions of the non-postal route location to which the mail records are addressed.

After extraction of non-postal records is complete, the non-postal records are preferably associated with mail items to facilitate delivery. That is, address information including the street address may be selected from the non-postal route records and either printed directly on the mail items or on labels to be affixed to the mail items. The mail items may be letter or non-letter items. For a given non-postal route location, letter mail items are preferably bundled according to the destination address. All mail items are weighed and postage is paid according to the weight of the mail items thus realizing a substantial savings over the per-piece rate charged by the USPS.

In accordance with an additional aspect of the invention, several different types of reports may be generated using data collected during extraction and sort key assignment. Normal mailer processing (generating statements, mailing labels, etc.) will continue after this point.

While the invention has been disclosed with reference to a limited number of embodiments, it is apparent that variations and modification may be made therein, and it is therefore intended in the following claims to cover each such variation and modification as falls within the true spirit and scope of the invention.

What is claimed is:

1. A data processing method for extracting non-postal route mail records from among a plurality of input mail records, comprising:

selecting address information from an input mail record;

comparing the selected address information to address information of each of the one or more non-postal route data sets until a match is found and repeating the selection and comparison steps for the plurality of input mail records, each input mail record that contains address information that matches address information of the one or more non-postal route data sets being a non-postal route mail record;

grouping together non-postal route mail records addressed to the same non-postal route location;

subdividing the grouped non-postal route mail records by destination into destination groups; and sequencing the non-postal route input mail records within a destination group according to a predetermined pattern of delivery.

2. The method of claim 1 further comprising tallying the number of input mail records addressed to a common non-postal route location and comparing the tally to a predetermined number.

3. A computer readable medium including instructions executable by a processor based device that, upon execution by the processor based device, causes the processor based device to extract non-postal route mail records from among a plurality of input mail records by:

selecting address information from an input mail record;

comparing the address information from the input mail record to address information of non-postal route data sets until a match is found and repeating the selection and comparison steps for a plurality of input mail records, each input mail record that contains address information that matches address information of a non-postal route data set being a non-postal route mail record;

grouping together non-postal route mail records addressed to the same non-postal route location;

subdividing the grouped non-postal route mail records by destination into destination groups; and sequencing the non-postal route mail records within a destination group according to a predetermined pattern of delivery.

4. A processing system, including a non-postal route data table having one or more non-postal route data sets, for extracting non-postal route mail records from among a plurality of input mail records comprising:

a data processor programmed to:

select address information from an input mail record;

compare the address information for the input mail record to address information of each of the one or more non-postal route data sets until a match is found and repeat selection and comparison for the plurality of input mail records, each input mail record that contains address information that matches address information of the one or more non-postal route data sets being a non-postal route mail record;

group together non-postal route mail records addressed to the same non-postal route location;

subdivide the grouped non-postal route mail records by destination into destination groups; and sequence the non-postal route input mail records within a destination group according to a predetermined pattern of delivery.

* * * * *